(12) United States Patent
Wang et al.

(10) Patent No.: US 9,838,190 B2
(45) Date of Patent: Dec. 5, 2017

(54) CHANNEL TIMING METHOD, APPARATUS, AND COMMUNICATION SYSTEM FOR MULTIFLOW TRANSMISSION

(71) Applicant: Huawei Technologies Co., Ltd., Shenzhen, Guangdong (CN)

(72) Inventors: Fan Wang, Stockholm (SE); Xueli Ma, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 179 days.

(21) Appl. No.: 14/741,031

(22) Filed: Jun. 16, 2015

(65) Prior Publication Data
US 2015/0280889 A1    Oct. 1, 2015

Related U.S. Application Data

(63) Continuation of application No. PCT/CN2012/087164, filed on Dec. 21, 2012.

(51) Int. Cl.
*H04J 3/00* (2006.01)
*H04L 5/00* (2006.01)
(Continued)

(52) U.S. Cl.
CPC ............. *H04L 5/0078* (2013.01); *H04J 3/16* (2013.01); *H04L 5/0048* (2013.01); *H04W 56/00* (2013.01); *H04W 56/001* (2013.01)

(58) Field of Classification Search
CPC ...................................................... H04J 3/16
See application file for complete search history.

(56) References Cited

U.S. PATENT DOCUMENTS

2006/0133323 A1   6/2006   Obuchi et al.
2006/0274712 A1   12/2006  Malladi et al.
(Continued)

FOREIGN PATENT DOCUMENTS

| CN | 102421116 A | 4/2012 |
| CN | 102595481 A | 7/2012 |
| RU | 2009117077 A | 11/2010 |

OTHER PUBLICATIONS

"Multiflow HS-DPCCH timing", Nokia Siemens Networks, 3GPP TSG RAN WG1 Meeting #69, May 21-25, 2012, 6 pages, R1-122575.
(Continued)

*Primary Examiner* — Jason Mattis
*Assistant Examiner* — Kevin Cunningham

(57) ABSTRACT

Embodiments of the present invention disclose a channel timing method and apparatus for multiflow transmission, where the method includes: configuring time reference information of a non-time reference cell in a case of multiflow transmission; and sending the time reference information to the non-time reference cell, so that the non-time reference cell obtains a high speed dedicated physical control channel (HS-DPCCH) timing by using the time reference information. According to the foregoing solution, time reference information of a non-time reference cell is configured at a higher layer, and is sent to a user equipment, so that the user equipment obtains a high speed dedicated physical control channel (HS-DPCCH) timing by using the time reference information, so that the UE can obtain correct timing relationships between the HS-DPCCH in the non-time reference cell and an uplink DPCH, and between the HS-DPCCH and an HS-PDSCH.

9 Claims, 2 Drawing Sheets

```
                        101
Configure time reference information of a non-time reference cell
              in a case of multiflow transmission 102
Send the time reference information to the non-time reference cell,
 so that the non-time reference cell obtains a high speed dedicated
   physical control channel HS-DPCCH timing by using the time
                      reference information
```

(51) Int. Cl.
*H04W 56/00* (2009.01)
*H04J 3/16* (2006.01)

(56) References Cited

U.S. PATENT DOCUMENTS

| | | | | |
|---|---|---|---|---|
| 2013/0114577 A1* | 5/2013 | Cai | ....................... | H04L 5/0053 370/336 |
| 2013/0242829 A1* | 9/2013 | Ge | ..................... | H04W 56/005 370/311 |
| 2014/0036883 A1* | 2/2014 | Chen | ..................... | H04L 5/0078 370/336 |

OTHER PUBLICATIONS

"Discussion on detailed timing requirements for HSDPA Multiflow", Nokia Siemens Networks, TSG-RAN Working Group 4 (Radio) meeting #65, Nov. 12-16, 2012, 3 pages, R4-126178.

"Discussion on mechanism for updating of cell pairing", Huawei, HiSilicon, 3GPP TSG-RAN WG2 #78, May 21-25, 2012, 6 pages, R2-122262.

"HSDPA Multiflow configuration", Nokia Siemens Networks, Huawei, HiSilicon, InterDigital Communications, 3GPP TSG-RAN WG2 Meeting #78, 6 pages, R2-122983.

"3rd Generation Partnership Project; Technical Specification Group Radio Access Network; Physical layer procedures (FDD) (Release 11)", 3GPP TS 25.214 V11.3.0, Sep. 2012, 112 pages.

"3rd Generation Partnership Project; Technical Specification Group Radio Access Network; Physical channels and mapping of transport channels onto physical channels (FDD) (Release 11)", 3GPP TS 25.211 V11.2.0, Dec. 2012, 63 pages.

"3rd Generation Partnership Project; Technical Specification Group Radio Access Network; UTRAN lub interface Node B Application Part (NBAP) signalling (Release 11)", 3GPP TS 25.433 V11.3.0, Dec. 2012, 1300 pages.

"3rd Generation Partnership Project; Technical Specification Group Radio Access Network; Physical channels and mapping of transport channels onto physical channels (FDD) (Release 9)", 3GPP TS 25.211 V9.2.0, Sep. 2010, 58 pages.

* cited by examiner

CHANNEL TIMING METHOD, APPARATUS, AND COMMUNICATION SYSTEM FOR MULTIFLOW TRANSMISSION

CROSS-REFERENCE TO RELATED APPLICATIONS

This application is a continuation of International Application No. PCT/CN2012/087164 filed on Dec. 21, 2012, which is hereby incorporated by reference in its entirety.

TECHNICAL FIELD

The present invention relates to the field of communications technologies, and in particular, to a channel timing method, apparatus, and communication system for multiflow transmission.

BACKGROUND

The Universal Mobile Telecommunications System (UMTS) is a mainstream third generation (3G) radio communications standard formulated by the Third Generation Partnership Project (3GPP). To meet users' increasing rate requirements, a high speed packet access (HSPA) technology is introduced into the UMTS to improve spectrum efficiency.

The HSPA supports multiflow transmission (Multiflow) in a published Release 11 protocol, that is, a user equipment (UE) may receive downlink high speed downlink shared channels (HS-DSCH) from multiple cells at a cell edge. Scenarios supported by the protocol include single frequency dual cell (SF-DC), dual frequency dual cell (DF-DC), dual frequency triple cell (DF-3C), and dual frequency quad cell (DF-4C).

In an SF-DC scenario, a UE receives downlink data of two cells at a same frequency, where one cell is a serving cell (serving HS-DSCH cell), and the other cell is an assisting serving cell (assisting serving HS-DSCH cell). Correspondingly, the UE feeds back an ACK/CQI (acknowledgement/ Channel Quality Indication) to each cell. On the 68th session of radio access network working group 1 (RAN 1), a consensus is reached: for an SF-DC, a UE uses one HS-DPCCH (high speed dedicated physical control channel) to provide a joint feedback to two cells, and the channel bears ACK/CQI information corresponding to a downlink.

For timing relationships between an HS-DPCCH and an uplink dedicated physical channel (DPCH), and between the HS-DPCCH and an HS-PDSCH (high speed physical downlink shared channel), concepts of a time reference cell and a non-time reference cell are introduced for Multiflow. The time reference cell (the time reference cell may be a serving cell, and may also be an assisting cell) is configured by a higher layer, and the timing relationships between an HS-DPCCH in the time reference cell and an uplink dedicated physical channel (DPCH), and between the HS-DPCCH and an HS-PDSCH are maintained the same as timing relationships in a case of non-Multiflow.

Currently, in the TS25.211 protocol, the only description is that a timing relationship of an HS-DPCCH in a time reference cell is obtained by calculating by using $\Gamma_{DIFF}$, and there is no description about how to obtain a timing relationship of an HS-DPCCH in a non-time reference cell. By directly applying related stipulations of $\Gamma_{DIFF}$, timing relationships between an HS-DPCCH in a non-time reference cell and an uplink DPCH, and between the HS-DPCCH and an HS-PDSCH are obtained or an error may occur.

SUMMARY

Embodiments of the present invention provide a channel timing method and apparatus for multiflow transmission, so as to obtain correct timing relationships between an HS-DPCCH in a non-time reference cell and an uplink DPCH, and between the HS-DPCCH and an HS-PDSCH.

A first aspect of the embodiments of the present invention provides a channel timing method for multiflow transmission, including:

configuring time reference information of a non-time reference cell in a case of multiflow transmission; and sending the time reference information to the non-time reference cell, so that the non-time reference cell obtains a high speed dedicated physical control channel HS-DPCCH timing by using the time reference information.

With reference to an implementation manner of the first aspect, in a first possible implementation manner, the time reference information of the non-time reference cell is a non-time reference.

With reference to the first aspect or the first possible implementation manner of the first aspect, in a second possible implementation manner, there is a correspondence between the time reference information of the non-time reference cell and a high speed physical downlink shared channel HS-PDSCH subframe boundary difference or an HS-PDSCH frame boundary difference of the non-time reference cell.

With reference to the first aspect, or the first or second possible implementation manner of the first aspect, in a third possible implementation manner, a value of the time reference information of the non-time reference cell is an integral multiple of 256.

With reference to the first aspect, or the first, second, or third possible implementation manner of the first aspect, in a fourth possible implementation manner, the value of the time reference information of the non-time reference cell is an integral multiple of 256 and a maximum value thereof is 3840 chips, where the chips are chips.

With reference to the third or fourth possible implementation manner of the first aspect, in a fifth possible implementation manner, the time reference information of the non-time reference cell, namely, Non-time Reference=$\Gamma_{DIFF} \pm \Delta\Gamma_{F\text{-}DPCH}$, where $\Gamma_{DIFF}$ is an HS-PDSCH subframe boundary difference or an HS-PDSCH frame boundary difference between a time reference cell and the non-time reference cell, and $\Delta\Gamma_{F\text{-}DPCH}$ is a fractional dedicated physical channel F-DPCH subframe boundary difference, an F-DPCH frame boundary difference, or an F-DPCH symbol boundary difference between the time reference cell and the non-time reference cell.

With reference to the third, fourth, or fifth possible implementation manner of the first aspect, in a sixth possible implementation manner, the time reference information of the non-time reference cell, namely, Non-time Reference=round($\Gamma_{DIFF}/256$)*256, where $\Gamma_{DIFF}$ is an HS-PDSCH subframe boundary difference or an HS-PDSCH frame boundary difference between the time reference cell and the non-time reference cell, and round is rounding calculation.

With reference to the fifth or sixth possible implementation manner of the first aspect, in a seventh possible implementation manner, an HS-DPCCH timing of the non-time reference cell is:

$m=(T_{TX\_diff}\pm\text{Non-time Reference})/256+101;$ or $m=(\text{mod}(T_{TX\_diff}\pm\text{Non-time Reference},38400))/256+101,$ where mod is a modulo operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

With reference to the first aspect or the first or second possible implementation manner of the first aspect, in an eighth possible implementation manner, a value range of the time reference information of the non-time reference cell is [0, 3840] chips.

With reference to the first aspect or the first, second, or eighth possible implementation manner of the first aspect, in a ninth possible implementation manner, the time reference information of the non-time reference cell, namely, Non-time Reference=$\Gamma_{DIFF}$, where $\Gamma_{DIFF}$ is an HS-PDSCH subframe boundary difference or an HS-PDSCH frame boundary difference between a time reference cell and the non-time reference cell.

With reference to the first aspect or the first, second, eighth, or ninth possible implementation manner of the first aspect, in a tenth possible implementation manner, an HS-DPCCH timing of the non-time reference cell is:

$m=\text{round}(T_{TX\_diff}\pm\text{Non-time Reference})/256+101;$ or $m=\text{mod}(T_{TX\_diff}\pm\text{Non-time Reference},38400))/256+101,$ where mod is a modulo operation, round is a rounding operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

A second aspect of the embodiments of the present invention provides a channel timing apparatus for multiflow transmission, where the channel timing apparatus for multiflow transmission is a higher layer network device, including:

a configuring unit, adapted to configure time reference information of a non-time reference cell in a case of multiflow transmission; and a sending unit, configured to send the time reference information configured by the configuring unit to the non-time reference cell, so that the non-time reference cell obtains a high speed dedicated physical control channel HS-DPCCH timing by using the time reference information.

With reference to an implementation manner of the second aspect, in a first possible implementation manner, the time reference information of the non-time reference cell configured by the configuring unit is a non-time reference.

With reference to the second aspect or the first possible implementation manner of the second aspect, in a second possible implementation manner, there is a correspondence between the time reference information of the non-time reference cell and a high speed physical downlink shared channel HS-PDSCH subframe boundary difference or an HS-PDSCH frame boundary difference of the non-time reference cell.

With reference to the second aspect or the first or second possible implementation manner of the second aspect, in a third possible implementation manner, a value of the time reference information of the non-time reference cell configured by the configuring unit is an integral multiple of 256.

With reference to the second aspect or the first, second, or third possible implementation manner of the second aspect, in a fourth possible implementation manner, the value of the time reference information of the non-time reference cell configured by the configuring unit is an integral multiple of 256 and a maximum value thereof is 3840 chips, where the chips are chips.

With reference to the third or fourth possible implementation manner of the second aspect, in a fifth possible implementation manner, the time reference information of the non-time reference cell configured by the configuring unit, namely, Non-time Reference=$\Gamma_{DIFF}\pm\Delta\Gamma_{F\text{-}DPCH}$, where $\Gamma_{DIFF}$ is an HS-PDSCH subframe boundary difference or an HS-PDSCH frame boundary difference between a time reference cell and the non-time reference cell, and $\Delta\delta_{F\text{-}DPCH}$ is a fractional dedicated physical channel F-DPCH subframe boundary difference, an F-DPCH frame boundary difference, or an F-DPCH symbol boundary difference between the time reference cell and the non-time reference cell.

With reference to the third, fourth, or fifth possible implementation manner of the second aspect, in a sixth possible implementation manner, the time reference information of the non-time reference cell configured by the configuring unit, namely, Non-time Reference=round $(\Gamma_{DIFF}/256)*256$, where $\delta_{DIFF}$ is an HS-PDSCH subframe boundary difference or an HS-PDSCH frame boundary difference between the time reference cell and the non-time reference cell, and round is rounding calculation.

With reference to the second aspect or the first or second possible implementation manner of the second aspect, in an eighth possible implementation manner, a value range of the time reference information of the non-time reference cell configured by the configuring unit is [0, 3840] chips.

With reference to the second aspect or the first, second, or eighth possible implementation manner of the second aspect, in a ninth possible implementation manner, the time reference information of the non-time reference cell configured by the configuring unit, namely, Non-time Reference=$\Gamma_{DIFF}$, where $\Gamma_{DIFF}$ is an HS-PDSCH subframe boundary difference or an HS-PDSCH frame boundary difference between a time reference cell and the non-time reference cell.

A third aspect of the embodiments of the present invention provides a channel timing method for multiflow transmission, including:

receiving time reference information of a non-time reference cell configured by a higher layer; and obtaining a high speed dedicated physical control channel HS-DPCCH timing in the non-time reference cell by using the time reference information.

With reference to an implementation manner of the third aspect, in a first possible implementation manner, the time reference information of the non-time reference cell is a non-time reference.

With reference to the third aspect or the first possible implementation manner of the third aspect, in a second possible implementation manner, there is a correspondence between the time reference information of the non-time reference cell and a high speed physical downlink shared channel HS-PDSCH subframe boundary difference or an HS-PDSCH frame boundary difference of the non-time reference cell.

With reference to the third aspect, or the first or second possible implementation manner of the third aspect, in a third possible implementation manner, a value of the time reference information of the non-time reference cell is an integral multiple of 256.

With reference to the third aspect or the first, second, or third possible implementation manner of the third aspect, in a fourth possible implementation manner, the value of the time reference information of the non-time reference cell is an integral multiple of 256 and a maximum value thereof is 3840 chips.

With reference to the third or fourth possible implementation manner of the third aspect, in a fifth possible implementation manner, the time reference information of the non-time reference cell, namely, Non-time Reference=$\Gamma_{DIFF} \pm \Delta\Gamma_{F-DPCH}$, where $\Gamma_{DIFF}$ is an HS-PDSCH subframe boundary difference or an HS-PDSCH frame boundary difference between a time reference cell and the non-time reference cell, and $\Delta\Gamma_{F-DPCH}$ is a fractional dedicated physical channel F-DPCH subframe boundary difference, an F-DPCH frame boundary difference, or an F-DPCH symbol boundary difference between the time reference cell and the non-time reference cell.

With reference to the third, fourth, or fifth possible implementation manner of the third aspect, in a sixth possible implementation manner, the time reference information of the non-time reference cell, namely, Non-time Reference=round($\Gamma_{DIFF}$/256)*256, where $\Gamma_{DIFF}$ is an HS-PDSCH subframe boundary difference or an HS-PDSCH frame boundary difference between the time reference cell and the non-time reference cell, and round is rounding calculation.

With reference to the fifth or sixth possible implementation manner of the third aspect, in a seventh possible implementation manner, an HS-DPCCH timing of the non-time reference cell is:

$m=(T_{TX\_diff} \pm \text{Non-time Reference})/256+101;$ or $m=(\text{mod}(T_{TX\_diff} \pm \text{Non-time Reference},38400))/256+101,$ where mod is a modulo operation, a range of $T_{TX\_diff}$ an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

With reference to the third aspect or the first or second possible implementation manner of the third aspect, in an eighth possible implementation manner, a value range of the time reference information of the non-time reference cell is [0, 3840] chips.

With reference to the third aspect or the first, second, or eighth possible implementation manner of the third aspect, in a ninth possible implementation manner, the time reference information of the non-time reference cell, namely, Non-time Reference=$\Gamma_{DIFF}$, where $\Gamma_{DIFF}$ is an HS-PDSCH subframe boundary difference or an HS-PDSCH frame boundary difference between a time reference cell and the non-time reference cell.

With reference to the third aspect or the first, second, eighth, or ninth possible implementation manner of the third aspect, in a tenth possible implementation manner, an HS-DPCCH timing of the non-time reference cell is:

$m=\text{round}(T_{TX\_diff} \pm \text{Non-time Reference})/256+101;$ or $m=\text{round}(\text{mod}(T_{TX\_diff} \pm \text{Non-time Reference},38400))/256+101,$ where mod is a modulo operation, round is a rounding operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

A fourth aspect of the embodiments of the present invention provides a channel timing apparatus for multiflow transmission, where the channel timing apparatus for multiflow transmission is a user equipment, including:

a receiving unit, configured to receive time reference information of a non-time reference cell configured by a higher layer; and a timing calculating unit, configured to obtain a high speed dedicated physical control channel HS-DPCCH timing in the non-time reference cell by using the time reference information received by the receiving unit.

With reference to an implementation manner of the fourth aspect, in a first possible implementation manner, the time reference information of the non-time reference cell received by the receiving unit is a non-time reference.

With reference to the fourth aspect or the first possible implementation manner of the fourth aspect, in a second possible implementation manner, there is a correspondence between the time reference information of the non-time reference cell and a high speed physical downlink shared channel HS-PDSCH subframe boundary difference or an HS-PDSCH frame boundary difference of the non-time reference cell.

With reference to the fourth aspect or the first or second possible implementation manner of the fourth aspect, in a third possible implementation manner, a value of the time reference information of the non-time reference cell received by the receiving unit is an integral multiple of 256.

With reference to the fourth aspect or the first, second, or third possible implementation manner of the fourth aspect, in a fourth possible implementation manner, the value of the time reference information of the non-time reference cell is an integral multiple of 256 and a maximum value thereof is 3840 chips.

With reference to the third or fourth possible implementation manner of the fourth aspect, in a fifth possible implementation manner, the time reference information of the non-time reference cell received by the receiving unit, namely, Non-time Reference=$\Gamma_{DIFF} \pm \Delta\Gamma_{F-DPCH}$, where $\Gamma_{DIFF}$ is an HS-PDSCH subframe boundary difference or an HS-PDSCH frame boundary difference between a time reference cell and the non-time reference cell, and $\Delta\Gamma_{F-DPCH}$ is a fractional dedicated physical channel F-DPCH subframe boundary difference, an F-DPCH frame boundary difference, or an F-DPCH symbol boundary difference between the time reference cell and the non-time reference cell.

With reference to the third, fourth, or fifth possible implementation manner of the fourth aspect, in a sixth possible implementation manner, the time reference information of the non-time reference cell received by the receiving unit, namely, Non-time Reference=round($\Gamma_{DIFF}$/256)*256, where $\Gamma_{DIFF}$ is an HS-PDSCH subframe boundary difference or an HS-PDSCH frame boundary difference between the time reference cell and the non-time reference cell, and round is rounding calculation.

With reference to the fifth or sixth possible implementation manner of the fourth aspect, in a seventh possible implementation manner, the timing calculating unit is specifically configured to calculate, in the non-time reference cell, an HS-DPCCH timing of the non-time reference cell by using the following formula: m=($T_{TX\_diff}$±Non-time Reference)/256+101 or m=(mod($T_{TX\_diff}$±Non-time Reference, 38400))/256+101, where mod is a modulo operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

With reference to the fourth aspect or the first or second possible implementation manner of the fourth aspect, in an eighth possible implementation manner, a value range of the time reference information of the non-time reference cell received by the receiving unit is [0, 3840] chips.

With reference to the fourth aspect or the first, second, or eighth possible implementation manner of the fourth aspect, in a ninth possible implementation manner, the time reference information of the non-time reference cell received by the receiving unit, namely, Non-time Reference=$\Gamma_{DIFF}$, where $\Gamma_{DIFF}$ is an HS-PDSCH subframe boundary difference or an HS-PDSCH frame boundary difference between a time reference cell and the non-time reference cell.

With reference to the fourth aspect or the first, second, eighth, or ninth possible implementation manner of the fourth aspect, in a tenth possible implementation manner, the timing calculating unit is specifically configured to calculate, in the non-time reference cell, an HS-DPCCH timing of the non-time reference cell by using the following formula: m=round($T_{TX\_diff}$±Non-time Reference)/256+101 or m=round(mod($T_{TX\_diff}$±Non-time Reference, 38400))/256+101, where mod is a modulo operation, round is a rounding operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

A fifth aspect of the embodiments of the present invention provides a higher layer network device, including a processor, a memory, and a sending device, where the processor is adapted to configure time reference information of a non-time reference cell in a case of multiflow transmission; and the sending device is configured to send the time reference information configured by the processor in the non-time reference cell to the non-time reference cell, where the time reference information configured by the processor enables the non-time reference cell to obtain a high speed dedicated physical control channel HS-DPCCH timing by using the time reference information.

With reference to an implementation manner of the fifth aspect, in a first possible implementation manner, the time reference information of the non-time reference cell configured by the processor is a non-time reference.

With reference to the fifth aspect or the first possible implementation manner of the fifth aspect, in a second possible implementation manner, there is a correspondence between the time reference information of the non-time reference cell and a high speed physical downlink shared channel HS-PDSCH subframe boundary difference or an HS-PDSCH frame boundary difference of the non-time reference cell.

With reference to the fifth aspect or the first or second possible implementation manner of the fifth aspect, in a third possible implementation manner, a value of the time reference information of the non-time reference cell configured by the processor is an integral multiple of 256.

With reference to the fifth aspect or the first, second, or third possible implementation manner of the fifth aspect, in a fourth possible implementation manner, the value of the time reference information of the non-time reference cell configured by the processor is an integral multiple of 256 and a maximum value thereof is 3840 chips, where the chips are chips.

With reference to the third or fourth possible implementation manner of the fifth aspect, in a fifth possible implementation manner, the time reference information of the non-time reference cell configured by the processor, namely, Non-time Reference=$\Gamma_{DIFF}$±$\Delta\Gamma_{F-DPCH}$ where $\Gamma_{DIFF}$ is an HS-PDSCH subframe boundary difference or an HS-PDSCH frame boundary difference between a time reference cell and the non-time reference cell, and $\Delta\Gamma_{F-DPCH}$ is a fractional dedicated physical channel F-DPCH subframe boundary difference, an F-DPCH frame boundary difference, or an F-DPCH symbol boundary difference between the time reference cell and the non-time reference cell.

With reference to the third, fourth, or fifth possible implementation manner of the fifth aspect, in a sixth possible implementation manner, the time reference information of the non-time reference cell configured by the processor, namely, Non-time Reference=round($\Gamma_{DIFF}$/256)*256, where $\Gamma_{DIFF}$ is an HS-PDSCH subframe boundary difference or an HS-PDSCH frame boundary difference between the time reference cell and the non-time reference cell, and round is rounding calculation.

With reference to the fifth aspect or the first or second possible implementation manner of the fifth aspect, in an eighth possible implementation manner, a value range of the time reference information of the non-time reference cell is [0, 3840] chips.

With reference to the fifth aspect or the first, second, or eighth possible implementation manner of the fifth aspect, in a ninth possible implementation manner, the time reference information of the non-time reference cell configured by the processor, namely, Non-time Reference=$\Gamma_{DIFF}$, where $\Gamma_{DIFF}$ is an HS-PDSCH subframe boundary difference or an HS-PDSCH frame boundary difference between a time reference cell and the non-time reference cell.

A sixth aspect of the embodiments of the present invention provides a channel timing apparatus for multiflow transmission, where the channel timing apparatus for multiflow transmission is a user equipment, including a processor, a memory, and a receiving device, where the receiving device is configured to receive time reference information of a non-time reference cell configured by a higher layer; and the processor is configured to obtain a high speed dedicated physical control channel HS-DPCCH timing in the non-time reference cell by using the time reference information.

With reference to an implementation manner of the sixth aspect, in a first possible implementation manner, the time reference information of the non-time reference cell received by the receiving device is a non-time reference.

With reference to the sixth aspect or the first possible implementation manner of the sixth aspect, in a second possible implementation manner, there is a correspondence between the time reference information of the non-time reference cell and a high speed physical downlink shared channel HS-PDSCH subframe boundary difference or an HS-PDSCH frame boundary difference of the non-time reference cell.

With reference to the sixth aspect or the first or second possible implementation manner of the sixth aspect, in a third possible implementation manner, a value of the time reference information of the non-time reference cell received by the receiving device is an integral multiple of 256.

With reference to the sixth aspect or the first, second, or third possible implementation manner of the sixth aspect, in a fourth possible implementation manner, the value of the time reference information of the non-time reference cell received by the receiving device is an integral multiple of 256 and a maximum value thereof is 3840 chips.

With reference to the third or fourth possible implementation manner of the sixth aspect, in a fifth possible implementation manner, the time reference information of the non-time reference cell received by the receiving device, namely, Non-time Reference=$\Gamma_{DIFF} \pm \Delta\Gamma_{F\text{-}DPCH}$, where $\Gamma_{DIFF}$ is an HS-PDSCH subframe boundary difference or an HS-PDSCH frame boundary difference between a time reference cell and the non-time reference cell, and $\Delta\Gamma_{F\text{-}DPCH}$ is a fractional dedicated physical channel F-DPCH subframe boundary difference, an F-DPCH frame boundary difference, or an F-DPCH symbol boundary difference between the time reference cell and the non-time reference cell.

With reference to the third, fourth, or fifth possible implementation manner of the sixth aspect, in a sixth possible implementation manner, the time reference information of the non-time reference cell received by the receiving device, namely, Non-time Reference=round($\Gamma_{DIFF}$/256)*256, where $\Gamma_{DIFF}$ is an HS-PDSCH subframe boundary difference or an HS-PDSCH frame boundary difference between the time reference cell and the non-time reference cell, and round is rounding calculation.

With reference to the fifth or sixth possible implementation manner of the sixth aspect, in a seventh possible implementation manner, the processor is specifically configured to calculate, in the non-time reference cell, an HS-DPCCH timing of the non-time reference cell by using the following formula: m=($T_{TX\_diff} \pm$Non-time Reference)/256+101 or m=(mod($T_{TX\_diff} \pm$Non-time Reference, 38400))/256+101, where mod is a modulo operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

With reference to the sixth aspect or the first or second possible implementation manner of the sixth aspect, in an eighth possible implementation manner, a value range of the time reference information of the non-time reference cell received by the receiving device is [0, 3840] chips.

With reference to the sixth aspect or the first, second, or eighth possible implementation manner of the sixth aspect, in a ninth possible implementation manner, the time reference information of the non-time reference cell received by the receiving device, namely, Non-time Reference=$\Gamma_{DIFF}$, where $\Gamma_{DIFF}$ is an HS-PDSCH subframe boundary difference or an HS-PDSCH frame boundary difference between a time reference cell and the non-time reference cell.

With reference to the sixth aspect or the first, second, eighth, or ninth possible implementation manner of the sixth aspect, in a tenth possible implementation manner, the processor is specifically configured to calculate, in the non-time reference cell, an HS-DPCCH timing of the non-time reference cell by using the following formula: m=round ($T_{TX\_diff} \pm$Non-time Reference)/256+101 or m=round(mod ($T_{TX\_diff} \pm$Non-time Reference, 38400))/256+101, where mod is a modulo operation, round is a rounding operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

According to the foregoing technical solutions, the embodiments of the present invention have the following advantages: time reference information of a non-time reference cell is configured at a higher layer, and is sent to a user equipment, so that the user equipment obtains a high speed dedicated physical control channel HS-DPCCH timing by using the time reference information, so that the UE can obtain correct timing relationships between the HS-DPCCH in the non-time reference cell and an uplink DPCH, and between the HS-DPCCH and an HS-PDSCH.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
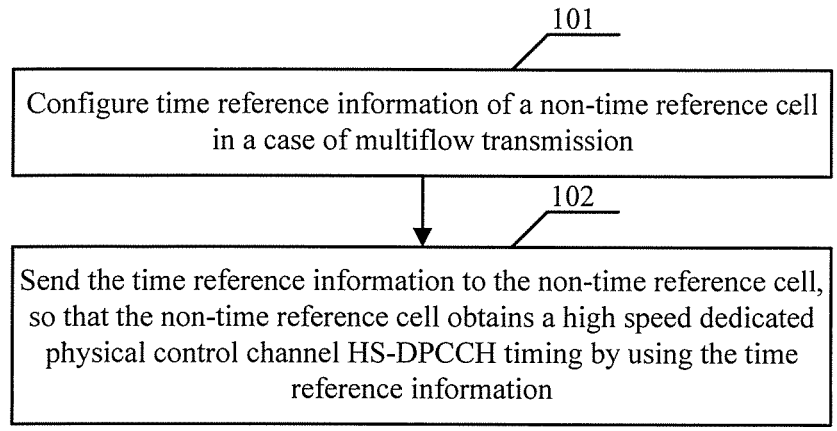
FIG. 1 is a schematic flowchart of a method according to an embodiment of the present invention.

An embodiment of the present invention provides a channel timing method for multiflow transmission. As shown in FIG. 1, the method includes:

101: Configure time reference information of a non-time reference cell in a case of multiflow transmission.

The foregoing step 101 may be that a configuration is completed at a higher layer, and according to a stipulation in the HS25 protocol, the higher layer refers to a layer 3 (Layer 3) network device, for example, a radio network controller (RNC) and the like.

Optionally, the time reference information of the non-time reference cell in step 101 may be set by using a non-time reference value defined by the higher layer that is defined in the HS25 protocol, where the time reference information of the non-time reference cell is a non-time reference.

There is a correspondence between the time reference information of the non-time reference cell and a high speed physical downlink shared channel HS-PDSCH subframe boundary difference or an HS-PDSCH frame boundary difference of the non-time reference cell. The correspondence may be a preset correspondence. As long as a relationship between the two can be established, and the other may be obtained by calculating based on one. A specific correspondence is not limited in this embodiment of the present invention.

Optionally, a value of the time reference information of the non-time reference cell is an integral multiple of 256. Values, which are defined in a current protocol, of Non-time Reference are all integers in [0, 3840] chips. Therefore, a value interval is 1 chips, and if an integral multiple of 256 is used, a value interval is 256 chips. Therefore, in this solution, a value range is smaller, which may reduce an unnecessary signaling overhead; and a value range of Non-time Reference is reduced, which reduces an unnecessary test overhead.

To calculate and obtain a value m of the non-time reference cell the same as that of the time reference cell to ensure a correct HS-DPCCH timing, a value of the time reference information of the non-time reference cell is an integral multiple of 256, and optionally, a maximum value thereof is 3840 chips, where the chips are chips.

The time reference information of the non-time reference cell may be: Non-time Reference=$\Gamma_{DIFF} \pm \Delta\Gamma_{F\text{-}DPCH}$, where is an HS-PDSCH subframe boundary difference or an HS-PDSCH frame boundary difference between the time reference cell and the non-time reference cell, and $\Delta\Gamma_{F\text{-}DPCH}$ is a fractional dedicated physical channel F-DPCH subframe boundary difference, an F-DPCH frame boundary difference, or an F-DPCH symbol boundary difference between the time reference cell and the non-time reference cell.

The time reference information of the non-time reference cell may also be: Non-time Reference=round($\Gamma_{DIFF}$/256)*256, $\Gamma_{DIFF}$ is an HS-PDSCH subframe boundary difference or an HS-PDSCH frame boundary difference between the time reference cell and the non-time reference cell, and round is rounding calculation.

Non-time Reference may unnecessarily be an integral multiple of 256, and the value range of the time reference information of the non-time reference cell may include [0, 3840] chips, and optionally may be [0, 3840] chips.

The time reference information of the non-time reference cell, namely, Non-time Reference=$\Gamma_{DIFF}$, where is an HS-PDSCH subframe boundary difference or an HS-PDSCH frame boundary difference between the time reference cell and the non-time reference cell.

102: Send the time reference information to the non-time reference cell, so that the non-time reference cell obtains a high speed dedicated physical control channel HS-DPCCH timing by using the time reference information.

In this embodiment, the time reference information is used when the non-time reference cell obtains the HS-DPCCH timing, and may be sent to any entity in the non-time reference cell, for example, a UE and a base station, which is not limited in this embodiment of the present invention. For an entity executing sending the time reference information, refer to the foregoing description, and the entity may be a RNC.

According to the foregoing solution, time reference information of a non-time reference cell is configured at a higher layer, and is sent to the non-time reference cell, so that the non-time reference cell obtains a high speed dedicated physical control channel HS-DPCCH timing by using the time reference information, and therefore, correct timing relationships between the HS-DPCCH in the non-time reference cell and an uplink dedicated physical channel (DPCH), and between the HS-DPCCH and an HS-PDSCH can be obtained.

If an integral multiple of 256 is used as Non-time Reference, an HS-DPCCH timing of a non-time reference cell is: m=($T_{TX\_diff} \pm$Non-time Reference)/256+101 or m=(mod($T_{TX\_diff} \pm$Non-time Reference, 38400))/256+101, where mod is a modulo operation, a range of $T_{TX\_diff}$ is an integral multiple of 256 and a maximum value thereof is 38144 chips, and $T_{TX\_diff}$ a difference between the following two timings, where one timing is an HS-PDSCH frame header, and the other timing is a downlink dedicated physical channel (DL DPCH) frame or a fractional dedicated physical channel (F-DPCH) frame header, and a DL DPCH or an F-DPCH frame includes an HS-PDSCH frame header.

If a solution that Non-time Reference is unnecessarily an integral multiple of 256 is used, an HS-DPCCH timing of a non-time reference cell is: m=round($T_{TX\_diff} \pm$Non-time Reference)/256+101 or m=round(mod($T_{TX\_diff} \pm$Non-time Reference, 38400))/256+101, where mod is a modulo operation, round is a rounding operation, a range of $T_{TX\_diff}$ is an integral multiple of 256 and a maximum value thereof is 38144 chips, and $T_{TX\_diff}$ is a difference between the following two timings, where one timing is an HS-PDSCH frame header, and the other timing is a DL DPCH frame or an F-DPCH frame header, and a DL DPCH or an F-DPCH frame includes an HS-PDSCH frame header.

Figure 2:
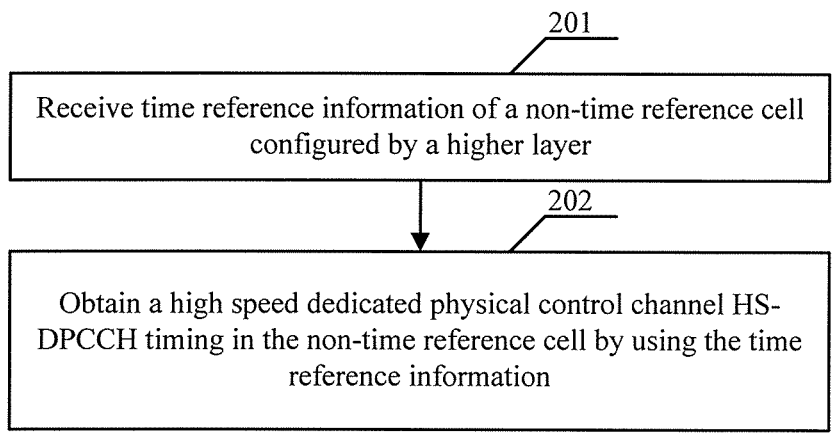
FIG. 2 is a schematic flowchart of another method according to an embodiment of the present invention.

Corresponding to an implementation solution using a higher layer, an embodiment of the present invention further provides another channel timing method for multiflow transmission. This solution is implemented on a user equipment side. As shown in FIG. 2, the method includes:

201: Receive time reference information of a non-time reference cell configured by a higher layer.

Optionally, the time reference information of the non-time reference cell in step 101 may be set by using a non-time reference value defined by the higher layer that is defined in the HS25 protocol, where the time reference information of the non-time reference cell is a non-time reference.

There is a correspondence between the time reference information of the non-time reference cell and a high speed physical downlink shared channel HS-PDSCH subframe boundary difference or an HS-PDSCH frame boundary difference of the non-time reference cell. The correspondence may be a preset correspondence. As long as a relationship between the two can be established, and the other may be obtained by calculating based on one. A specific correspondence is not limited in this embodiment of the present invention.

Optionally, a value of the time reference information of the non-time reference cell is an integral multiple of 256. Using this solution may avoid an unnecessary signaling overhead due to that values of Non-time Reference cover an excessively large value range of [0, 3840] chips, and avoid an unnecessary test overhead due to excessive values of Non-time Reference. Correspondingly, the signaling overhead and the test overhead may be reduced.

To calculate and obtain a value m of the non-time reference cell the same as that of the time reference cell to ensure a correct HS-DPCCH timing, a value of the time reference information of the non-time reference cell is an integral multiple of 256, and a maximum value thereof is 3840 chips, where the chips are chips.

The time reference information of the non-time reference cell, namely, Non-time Reference=$\Gamma_{DIFF} \pm \Delta\Gamma_{F-DPCH}$, where $\Gamma_{DIFF}$ is an HS-PDSCH subframe boundary difference or an HS-PDSCH frame boundary difference between the time reference cell and the non-time reference cell, and $\Delta\Gamma_{F-DPCH}$ is a fractional dedicated physical channel F-DPCH subframe boundary difference, an F-DPCH frame boundary difference, or an F-DPCH symbol boundary difference between the time reference cell and the non-time reference cell.

The time reference information of the non-time reference cell, namely, Non-time Reference=round($\Gamma_{DIFF}$/256)*256, where $\Gamma_{DIFF}$ is an HS-PDSCH subframe boundary difference or an HS-PDSCH frame boundary difference between the time reference cell and the non-time reference cell, and round is rounding calculation.

Non-time Reference may unnecessarily be an integral multiple of 256, and to calculate and obtain a value m of the non-time reference cell the same as that of the time reference cell to ensure a correct HS-DPCCH timing, and a value range of the time reference information of the non-time reference cell is [0, 3840] chips.

The time reference information of the non-time reference cell, namely, Non-time Reference=$\Gamma_{DIFF}$, where $\Gamma_{DIFF}$ is an HS-PDSCH subframe boundary difference or an HS-PDSCH frame boundary difference between the time reference cell and the non-time reference cell.

202: Obtain a high speed dedicated physical control channel HS-DPCCH timing in the non-time reference cell by using the time reference information.

According to the foregoing solution, time reference information of a non-time reference cell is configured at a higher layer, and is sent to a user equipment, so that the user equipment obtains a high speed dedicated physical control channel HS-DPCCH timing by using the time reference information, so that the UE can obtain correct timing relationships between the HS-DPCCH in the non-time reference cell and an uplink DPCH, and between the HS-DPCCH and an HS-PDSCH.

If an integral multiple of 256 is used as Non-time Reference, an HS-DPCCH timing in a non-time reference cell is: m=($T_{TX\_diff} \pm$Non-time Reference)/256+101 or m=(mod($T_{TX\_diff} \pm$Non-time Reference, 38400))/256+101, where mod is a modulo operation, a range of $T_{TX\_diff}$ is an integral multiple of 256 and a maximum value thereof is 38144 chips, and $T_{TX\_diff}$ is a difference between the following two timings, where one timing is an HS-PDSCH frame header, and the other timing is a DL DPCH frame or an F-DPCH frame header, and a DL DPCH or an F-DPCH frame includes an HS-PDSCH frame header.

If a solution that Non-time Reference is unnecessarily an integral multiple of 256 is used, an HS-DPCCH timing of a non-time reference cell is: m=round($T_{TX\_diff} \pm$Non-time Reference)/256+101 or m=round(mod($T_{TX\_diff} \pm$Non-time Reference, 38400))/256+101, where mod is a modulo operation, round is a rounding operation, a range of $T_{TX\_diff}$ is an integral multiple of 256 and a maximum value thereof is 38144 chips, and $T_{TX\_diff}$ is a difference between the following two timings, where one timing is an HS-PDSCH frame header, and the other timing is a DL DPCH frame or an F-DPCH frame header, and a DL DPCH or an F-DPCH frame includes an HS-PDSCH frame header.

Examples are used in the following embodiment to respectively describe a situation in which a value of Non-time Reference is an integral multiple of 256 chips and a situation in which a value of Non-time Reference is not an integral multiple of 256 chips:

1. This solution limits a value, which is configured by a higher layer, of Non-time Reference is an integral multiple of 256 chips, and an HS-DPCCH timing of a non-time reference cell is obtained by using Non-time Reference, which is specifically as follows:

A UE reports $\Gamma_{DIFF}$ in a 1A event, and a value range of $\Gamma_{DIFF}$ includes [0, 3840] chips, where the 1A event refers to that a primary pilot channel enters a report range, and is used to indicate that quality of a cell is close to quality of a best cell or an activity set, and when an activity set of the UE is full, reporting the 1A event is stopped.

Then time reference information (which may be Non-time Reference) is configured by a higher layer of a network, and a value range of the time reference information may be {0, 256, 512, . . . , 3840} chip, and in this embodiment, a value of Non-time Reference is an integral multiple of 256.

Optionally, a configuration solution is: Non-time Reference=$\Gamma_{DIFF} \pm (\Gamma_{F-DPCH2} - \Gamma_{F-DPCH1})$, and another configuration solution is: Non-time Reference=round($\Gamma_{DIFF}$/256)*256, where round is a rounding operation.

An HS-DPCCH timing of a non-time reference cell is obtained based on Non-time Reference configured by a higher layer, and a specific calculation method is: in the non-time reference cell, a calculation method of the HS-DPCCH timing is: m=($T_{TX\_diff} \pm$Non-time Reference)/256+101 or m=(mod($T_{TX\_diff} \pm$Non-time Reference, 38400))/256+101, where mod is a modulo operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

Two specific examples are provided below:

(1) For example: $\Gamma_{diff}$=10 chip, where $\Gamma_{DIFF}$ is reported by a UE, that is, an HS-PDSCH subframe boundary difference between a time reference cell and a non-time reference cell is 10 chips, a value of $T_{TX\_diff}$ of the time reference cell is 0 chip, an F-DPCH frame timing is 0 chip, a value of $T_{TX\_diff}$ of the non-time reference cell is 10 chips, and an F-DPCH frame timing of the non-time reference cell is 10 chips. In the time reference cell, m=($T_{TX\_diff}$/256)+101=101; and in the non-time reference cell, Non-time Reference=F$\Gamma_{DIFF} \pm (\Gamma_{F-DPCH2} - \Gamma_{F-DPCH1})$, where Non-time Reference is configured by a higher layer of a network side, that is, Non-time Reference=0 and m=($T_{TX\_diff} \pm$Non-time Reference)/256+101=101. Therefore, calculated values m of the time reference cell and the non-time reference cell are equal, and a correct HS-DPCCH timing can be obtained by the time reference cell and the non-time reference cell, so that an HS-DPCCH can be received correctly.

(2) For example: $\Gamma_{DIFF}$=10 chip, where $\Gamma_{DIFF}$ is reported by a UE, that is, an HS-PDSCH subframe boundary difference between a time reference cell and a non-time reference cell is 10 chips, a value of $T_{TX\_diff}$ of the time reference cell is 0, and a value of $T_{TX\_diff}$ of the non-time reference cell is 10. In the time reference cell, m=($T_{TX\_diff}$/256)+101=101; and in the non-time reference cell, Non-time Reference configured by a higher layer of a network side is that: Non-time Reference=round($\Gamma_{DIFF}$/256)*256, that is, Non-time Reference=0 and m=(($T_{TX\_diff}$−Non-time Reference)/256)+101=101. Therefore, calculated values m of the time reference cell and the non-time reference cell are equal, and a correct HS-DPCCH timing can be obtained by the time reference cell and the non-time reference cell, so that an HS-DPCCH can be received correctly. In addition, the value of Non-time Reference is an integral multiple of 256 chips, and therefore, an optional value is greatly reduced compared with an optional value used when a granularity is 1 chip. As a result, test complexity and a higher layer signaling overhead are reduced.

2. This solution limits that a value range of layer 3 (Layer 3) signaling Non-time Reference is not modified, and a calculation formula for a value m of a non-time reference cell is modified, and a specific solution is as follows:

Steps in this embodiment are as follows:

A UE reports $\Gamma_{DIFF}$ in a 1A event, where a value range of $\Gamma_{DIFF}$ includes [0, 3840] chips; and time reference information (which may be Non-time Reference) is configured by a higher layer of a network, and an optional configuration solution is: Non-time Reference=$\Gamma_{DIFF}$. An HS-DPCCH timing of the non-time reference cell is obtained based on Non-time Reference, and a specific calculation solution is as follows: a calculation method of the HS-DPCCH timing in the non-time reference cell is: m=round($T_{TX\_diff}$±Non-time Reference)/256+101 or m=round(mod($T_{TX\_diff}$±Non-time Reference, 38400))/256+101, where mod is a modulo operation, round is a rounding operation, a range of $T_{TX\_diff}$ is an integral multiple of 256 and a maximum value thereof is 38144 chips, and $T_{TX\_diff}$ is a difference between the following two timings, where one timing is an HS-PDSCH frame header, and the other timing is a DL DPCH frame or an F-DPCH frame header, and a DL DPCH or an F-DPCH frame includes an HS-PDSCH frame header. The range of $T_{TX\_diff}$ is an integral multiple of 256 and a maximum value thereof is 38144 chips, which means that the range of $T_{TX\_diff}$ is ($T_{TX\_diff}$=0, 256, . . . 38144) chip.

One specific example is provided below:

(1) For example: $\Gamma_{DIFF}$=10 chip, where $\Gamma_{DIFF}$ is reported by a UE, that is, an HS-PDSCH subframe boundary difference between a time reference cell and a non-time reference cell is 10 chips, a value of $T_{TX\_diff}$ in the time reference cell is 0, and a value of $T_{TX\_diff}$ in the non-time reference cell is 10. In the time reference cell, m=($T_{TX\_diff}$/256)+101=101; and in the non-time reference cell, Non-time Reference is configured to be equal to $\Gamma_{DIFF}$ by a higher layer of a network side, that is, Non-time Reference=10 and m=round ($T_{TX\_diff}$±Non-time Reference)/256+101=101. Therefore, calculated values m of the time reference cell and the non-time reference cell are equal, and a correct HS-DPCCH timing can be obtained by the time reference cell and the non-time reference cell, so that an HS-DPCCH can be received correctly.

Figure 3:
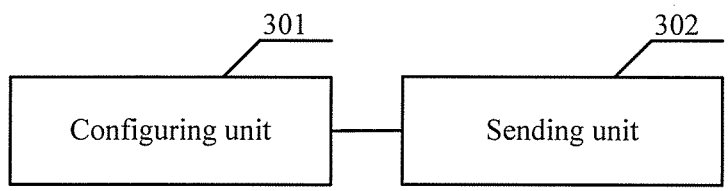
FIG. 3 is a schematic structural diagram of an apparatus according to an embodiment of the present invention.

An embodiment of the present invention further provides a channel timing apparatus for multiflow transmission, where the channel timing apparatus for multiflow transmission may be a higher layer network device. The higher layer network device refers to a layer 3 network device defined in the HS25 protocol, for example, radio resource control (Radio Resource Control, RRC). As shown in FIG. 3, the channel timing apparatus includes:

a configuring unit 301, adapted to configure time reference information of a non-time reference cell in a case of multiflow transmission; and a sending unit 302, configured to send the time reference information configured by the configuring unit 301 to the non-time reference cell, so that the non-time reference cell obtains a high speed dedicated physical control channel HS-DPCCH timing by using the time reference information.

According to the foregoing solution, time reference information of a non-time reference cell is configured at a higher layer, and is sent to a user equipment, so that the user equipment obtains a high speed dedicated physical control channel HS-DPCCH timing by using the time reference information, so that the UE can obtain correct timing relationships between the HS-DPCCH in the non-time reference cell and an uplink DPCH, and between the HS-DPCCH and an HS-PDSCH.

Optionally, the time reference information of the non-time reference cell configured by the configuring unit 301 is a non-time reference.

Optionally, there is a correspondence between the time reference information of the non-time reference cell configured by the configuring unit 301 and a high speed physical downlink shared channel HS-PDSCH subframe boundary difference or an HS-PDSCH frame boundary difference of the non-time reference cell.

Optionally, a value of the time reference information of the non-time reference cell configured by the configuring unit 301 is an integral multiple of 256.

Optionally, the value of the time reference information of the non-time reference cell configured by the configuring unit 301 is an integral multiple of 256 and a maximum value thereof is 3840 chips, where the chips are chips.

Optionally, the time reference information of the non-time reference cell configured by the configuring unit 301, namely, Non-time Reference=$\Gamma_{DIFF}$±$\Delta\Gamma_{F-DPCH}$, where $\Gamma_{DIFF}$ is an HS-PDSCH subframe boundary difference or an HS-PDSCH frame boundary difference between a time reference cell and the non-time reference cell, and $\Delta\Gamma_{F-DPCH}$ is a fractional dedicated physical channel F-DPCH subframe boundary difference, an F-DPCH frame boundary difference, or an F-DPCH symbol boundary difference between the time reference cell and the non-time reference cell.

Optionally, the time reference information of the non-time reference cell configured by the configuring unit 301, namely, Non-time Reference=round($\Gamma_{DIFF}$/256)*256, where $\Gamma_{DIFF}$ is an HS-PDSCH subframe boundary difference or an HS-PDSCH frame boundary difference between the time reference cell and the non-time reference cell, and round is rounding calculation.

Optionally, a value range of the time reference information of the non-time reference cell configured by the configuring unit 301 is [0, 3840] chips.

Optionally, the time reference information of the non-time reference cell configured by the configuring unit 301, namely, Non-time Reference=$\Gamma_{DIFF}$, where $\Gamma_{DIFF}$ is an HS-PDSCH subframe boundary difference or an HS-PDSCH frame boundary difference between the time reference cell and the non-time reference cell.

Figure 4:
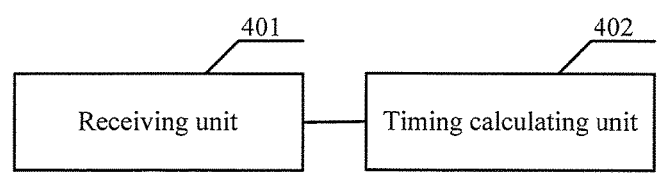
FIG. 4 is a schematic structural diagram of another apparatus according to an embodiment of the present invention.

An embodiment of the present invention further includes another channel timing apparatus for multiflow transmission, where the channel timing apparatus for multiflow transmission may be a user equipment. As shown in FIG. 4, the channel timing apparatus includes:

a receiving unit 401, configured to receive time reference information of a non-time reference cell configured by a higher layer; and a timing calculating unit 402, configured to obtain a high speed dedicated physical control channel HS-DPCCH timing in the non-time reference cell by using the time reference information received by the receiving unit 401.

According to the foregoing solution, time reference information of a non-time reference cell is configured at a higher layer, and is sent to a user equipment, so that the user equipment obtains a high speed dedicated physical control channel HS-DPCCH timing by using the time reference information, so that the UE can obtain correct timing relationships between the HS-DPCCH in the non-time reference cell and an uplink DPCH, and between the HS-DPCCH and an HS-PDSCH.

Optionally, the time reference information of the non-time reference cell received by the receiving unit 401 is a non-time reference.

Optionally, the time reference information of the non-time reference cell received by the receiving unit 401 and a high speed physical downlink shared channel HS-PDSCH subframe boundary difference or an HS-PDSCH frame boundary difference of the non-time reference cell.

Optionally, a value of the time reference information of the non-time reference cell received by the receiving unit 401 is an integral multiple of 256.

Optionally, the value of the time reference information of the non-time reference cell received by the receiving unit 401 is an integral multiple of 256 and a maximum value thereof is 3840 chips.

Optionally, the time reference information of the non-time reference cell received by the receiving unit 401, namely, Non-time Reference=$\Gamma_{DIFF} \pm \Delta \div_{F\text{-}DPCH}$, where $\Gamma_{DIFF}$ is an HS-PDSCH subframe boundary difference or an HS-PDSCH frame boundary difference between a time reference cell and the non-time reference cell, and $\Delta\delta_{F\text{-}DPCH}$ is a fractional dedicated physical channel F-DPCH subframe boundary difference, an F-DPCH frame boundary difference, or an F-DPCH symbol boundary difference between the time reference cell and the non-time reference cell.

Optionally, the time reference information of the non-time reference cell received by the receiving unit 401, namely, Non-time Reference=round($\Gamma_{DIFF}$/256)*256, where $\Gamma_{DIFF}$ is an HS-PDSCH subframe boundary difference or an HS-PDSCH frame boundary difference between the time reference cell and the non-time reference cell, and round is rounding calculation.

Optionally, the timing calculating unit 402 is specifically configured to calculate, in the non-time reference cell, an HS-DPCCH timing of the non-time reference cell by using the following formula: m=($T_{TX\_diff} \pm$Non-time Reference)/256+101 or m=(mod($T_{TX\_diff} \pm$Non-time Reference, 38400))/256+101, where mod is a modulo operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

Optionally, a value range of the time reference information of the non-time reference cell received by the receiving unit 401 is [0, 3840] chips.

Optionally, the time reference information of the non-time reference cell received by the receiving unit 401, namely, Non-time Reference=$\Gamma_{DIFF}$, where $\Gamma_{DIFF}$ is an HS-PDSCH subframe boundary difference or an HS-PDSCH frame boundary difference between a time reference cell and the non-time reference cell.

Optionally, the timing calculating unit 402 is specifically configured to calculate, in the non-time reference cell, an HS-DPCCH timing of the non-time reference cell by using the following formula: m=round($T_{TX\_diff} \pm$Non-time Reference)/256+101 or m=round(mod($T_{TX\_diff} \pm$Non-time Reference, 38400))/256+101, where mod is a modulo operation, round is a rounding operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

Figure 5:
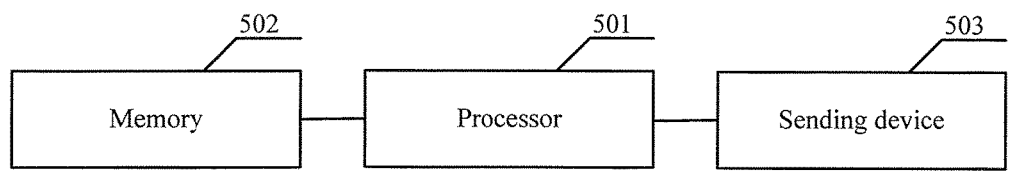
FIG. 5 is a schematic structural diagram of a network device according to an embodiment of the present invention.
Figure 6:
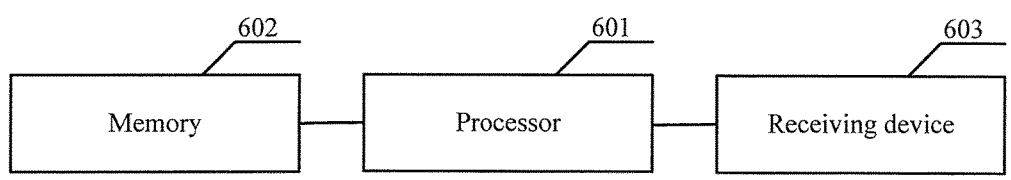
FIG. 6 is a schematic structural diagram of an apparatus according to an embodiment of the present invention.

An embodiment of the present invention further provides a higher layer network device, including a processor 501, a memory 502, and a sending device 503, as shown in FIG. 5, where:

the processor 501 is adapted to configure time reference information of a non-time reference cell in a case of multiflow transmission; and the sending device 503 is configured to send the time reference information of the non-time reference cell configured by the processor 501 to the non-time reference cell, where the time reference information configured by the processor 501 enables the non-time reference cell to obtain a high speed dedicated physical control channel HS-DPCCH timing by using the time reference information.

According to the foregoing solution, time reference information of a non-time reference cell is configured at a higher layer, and is sent to a user equipment, so that the user equipment obtains a high speed dedicated physical control channel HS-DPCCH timing by using the time reference information, so that the UE can obtain correct timing relationships between the HS-DPCCH in the non-time reference cell and an uplink DPCH, and between the HS-DPCCH and an HS-PDSCH.

Optionally, the time reference information of the non-time reference cell configured by the processor 501 is a non-time reference.

Optionally, there is a correspondence between the time reference information of the non-time reference cell configured by the processor 501 and a high speed physical downlink shared channel HS-PDSCH subframe boundary difference or an HS-PDSCH frame boundary difference of the non-time reference cell.

Optionally, a value of the time reference information of the non-time reference cell configured by the processor 501 is an integral multiple of 256.

Optionally, the value of the time reference information of the non-time reference cell configured by the processor 501 is an integral multiple of 256 and a maximum value thereof is 3840 chips, where the chips are chips.

Optionally, the time reference information of the non-time reference cell configured by the processor 501, namely, Non-time Reference=$\Gamma_{DIFF} \pm \Delta\Gamma_{F\text{-}DPCH}$, where $\Gamma_{DIFF}$ is an HS-PDSCH subframe boundary difference or an HS-PDSCH frame boundary difference between a time reference cell and the non-time reference cell, and $\Delta\Gamma_{F\text{-}DPCH}$ is a fractional dedicated physical channel F-DPCH subframe boundary difference, an F-DPCH frame boundary difference, or an F-DPCH symbol boundary difference between the time reference cell and the non-time reference cell.

Optionally, the time reference information of the non-time reference cell configured by the processor 501, namely, Non-time Reference=round($\Gamma_{DIFF}$/256)*256, where $\Gamma_{DIFF}$ is an HS-PDSCH subframe boundary difference or an HS-PDSCH frame boundary difference between the time reference cell and the non-time reference cell, and round is rounding calculation.

Optionally, a value range of the time reference information of the non-time reference cell is [0, 3840] chips.

Optionally, the time reference information of the non-time reference cell configured by the processor 501, namely, Non-time Reference=$\Gamma_{DIFF}$ where $\Gamma_{DIFF}$ is an HS-PDSCH subframe boundary difference or an HS-PDSCH frame boundary difference between a time reference cell and the non-time reference cell.

An embodiment of the present invention further provides another channel timing apparatus for multiflow transmission, where the channel timing apparatus for multiflow transmission is a user equipment, including a processor 601, a memory 602, and a receiving device 603, where the receiving device 603 is configured to receive time reference information of a non-time reference cell configured by a higher layer; and the processor 601 is configured to obtain a high speed dedicated physical control channel HS-DPCCH timing in the non-time reference cell by using the time reference information.

According to the foregoing solution, time reference information of a non-time reference cell is configured at a higher layer, and is sent to a user equipment, so that the user equipment obtains a high speed dedicated physical control channel HS-DPCCH timing by using the time reference information, so that the UE can obtain correct timing relationships between the HS-DPCCH in the non-time reference cell and an uplink DPCH, and between the HS-DPCCH and an HS-PDSCH.

Optionally, the time reference information of the non-time reference cell received by the receiving device 603 is a non-time reference.

Optionally, there is a correspondence between the time reference information of the non-time reference cell received by the receiving device 603 and a high speed physical downlink shared channel HS-PDSCH subframe boundary difference or an HS-PDSCH frame boundary difference of the non-time reference cell.

Optionally, a value of the time reference information of the non-time reference cell received by the receiving device 603 is an integral multiple of 256.

Optionally, the value of the time reference information of the non-time reference cell received by the receiving device 603 is an integral multiple of 256 and a maximum value thereof is 3840 chips.

Optionally, the time reference information of the non-time reference cell received by the receiving device 603, namely, Non-time Reference=$\Gamma_{DIFF}\pm\Delta\Gamma_{F-DPCH}$, where $\Gamma_{DIFF}$ is an HS-PDSCH subframe boundary difference or an HS-PDSCH frame boundary difference between a time reference cell and the non-time reference cell, and $\Delta\Gamma_{F-DPCH}$ is a fractional dedicated physical channel F-DPCH subframe boundary difference, an F-DPCH frame boundary difference, or an F-DPCH symbol boundary difference between the time reference cell and the non-time reference cell.

Optionally, the time reference information of the non-time reference cell received by the receiving device 603, namely, Non-time Reference=round($\Gamma_{DIFF}$/256)/*256, where $\Gamma_{DIFF}$ is an HS-PDSCH subframe boundary difference or an HS-PDSCH frame boundary difference between the time reference cell and the non-time reference cell, and round is rounding calculation.

Optionally, the processor 601 is specifically configured to calculate, in the non-time reference cell, an HS-DPCCH timing of the non-time reference cell by using the following formula: m=($T_{TX\_diff}\pm$Non-time Reference)/256+101 or m=(mod($T_{TX\_diff}\pm$Non-time Reference, 38400))/256+101, where mod is a modulo operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

Optionally, a value range of the time reference information of the non-time reference cell received by the receiving device 603 is [0, 3840] chips.

Optionally, the time reference information of the non-time reference cell received by the receiving device 603, namely, Non-time Reference=$\Gamma_{DIFF}$ where $\Gamma_{DIFF}$ is an HS-PDSCH subframe boundary difference or an HS-PDSCH frame boundary difference between a time reference cell and the non-time reference cell.

Optionally, the processor 601 is specifically configured to calculate, in the non-time reference cell, an HS-DPCCH timing of the non-time reference cell by using the following formula: m=($T_{TX\_diff}\pm$Non-time Reference)/256+101 or m=(mod($T_{TX\_diff}\pm$Non-time Reference, 38400))/256+101, where mod is a modulo operation, and round is a rounding operation, a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a DL DPCH frame or an F-DPCH frame header, and a DL DPCH or an F-DPCH frame includes the HS-PDSCH subframe header.

It should be noted that, the apparatus is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

In addition, a person of ordinary skill in the art may understand that all or apart of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. A channel timing method for multiflow transmission, the method comprising:
   receiving reference information of a non-time reference cell configured by a higher layer; and obtaining a high speed dedicated physical control channel (HS-DPCCH) timing in the non-time reference cell by using the reference information, wherein the reference information of the non-time reference cell is a non-time reference, namely, Non-time Reference, wherein an HS-DPCCH timing of the non-time reference cell is:

$$m=(T_{TX\_diff} \pm \text{Non-time Reference})/256+101;$$

wherein a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a downlink dedicated physical channel (DL DPCH) frame or a fractional dedicated physical channel (F-DPCH) frame header, and the DL DPCH or the F-DPCH frame comprises the HS-PDSCH subframe header, and wherein Non-time Reference=$\Gamma_{DIFF} \pm \Delta\Gamma_{F-DPCH}$, wherein $\Gamma_{DIFF}$ is an HS-PDSCH subframe boundary difference or an HS-PDSCH frame boundary difference between the time reference cell and the non-time reference cell, and $\Delta\Gamma_{F-DPCH}$ is an F-DPCH subframe boundary difference, an F-DPCH frame boundary difference, or an F-DPCH symbol boundary difference between the time reference cell and the non-time reference cell.

2. The method according to claim 1, wherein there is a correspondence between the reference information of the non-time reference cell and the HS-PDSCH subframe boundary difference or the HS-PDSCH frame boundary difference between the time reference cell and the non-time reference cell.

3. A channel timing method for multiflow transmission, the method comprising:

receiving reference information of a non-time reference cell configured by a higher layer; and obtaining a high speed dedicated physical control channel (HS-DPCCH) timing in the non-time reference cell by using the reference information, wherein the reference information of the non-time reference cell is a non-time reference (Non-time Reference), wherein an HS-DPCCH timing of the non-time reference cell is m=round $(T_{TX\_diff} \pm$ Non-time Reference$)/256+101$, wherein round is the rounding operation, a range of $T_{TX\_diff}$ is an integral multiple of 256 and a maximum value thereof is 38144 chips, and $T_{TX\_diff}$ is a difference between the following two timings, wherein one timing is an HS-PDSCH subframe header, and the other timing is a downlink dedicated physical channel (DL DPCH) frame or a fractional dedicated physical channel (F-DPCH) frame header, and the DL DPCH or the F-DPCH frame comprises the HS-PDSCH subframe header, and wherein Non-time Reference=$\Gamma_{DIFF} \pm \Delta\Gamma_{F-DPCH}$, wherein $\Gamma_{DIFF}$ is an HS-PDSCH subframe boundary difference or an HS-PDSCH frame boundary difference between the time reference cell and the non-time reference cell, and $\Delta\Gamma_{F-DPCH}$ is an F-DPCH subframe boundary difference, an F-DPCH frame boundary difference, or an F-DPCH symbol boundary difference between the time reference cell and the non-time reference cell.

4. A channel timing apparatus for multiflow transmission, the channel timing apparatus comprising a user equipment, comprising:

memory;

a receiving device configured to receive reference information of a non-time reference cell configured by a higher layer; and a processor configured to obtain a high speed dedicated physical control channel (HS-DPCCH) timing in the non-time reference cell by using the reference information, wherein the reference information of the non-time reference cell received by the receiving device is a non-time reference, namely, Non-time Reference, wherein an HS-DPCCH timing of the non-time reference cell is:

$$m=(T_{TX\_diff} \pm \text{Non-time Reference})/256+101;$$

wherein a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a downlink dedicated physical channel (DL DPCH) frame or a fractional dedicated physical channel (F-DPCH) frame header, and the DL DPCH or the F-DPCH frame comprises the HS-PDSCH subframe header, and wherein Non-time Reference=$\Gamma_{DIFF} \pm \Delta\Gamma_{F-DPCH}$, wherein $\Gamma_{DIFF}$ is an HS-PDSCH subframe boundary difference or an HS-PDSCH frame boundary difference between the time reference cell and the non-time reference cell, and $\Delta\Gamma_{F-DPCH}$ is an F-DPCH subframe boundary difference, an F-DPCH frame boundary difference, or an F-DPCH symbol boundary difference between the time reference cell and the non-time reference cell.

5. The apparatus according to claim 4, wherein there is a correspondence between the reference information of the non-time reference cell received by the receiving device and the HS-PDSCH subframe boundary difference or the HS-PDSCH frame boundary difference between the time reference cell and the non-time reference cell.

6. A channel timing apparatus for multiflow transmission, the channel timing apparatus comprising a user equipment, comprising:

memory;

a receiving device configured to receive reference information of a non-time reference cell configured by a higher layer; and a processor configured to obtain a high speed dedicated physical control channel (HS-DPCCH) timing in the non-time reference cell by using the reference information, wherein the reference information of the non-time reference cell received by the receiving device is a non-time reference, wherein the processor is configured to calculate, in the non-time reference cell, an HS-DPCCH timing of the non-time reference cell by using the following formula: m=round $(T_{TX\_diff} \pm$ Non-time Reference$)/256+101$, wherein round is the rounding operation, a range of $T_{TX\_diff}$ is an integral multiple of 256 and a maximum value thereof is 38144 chips, and $T_{TX\_diff}$ is a difference between the following two timings, wherein one timing is an HS-PDSCH subframe header, and the other timing is a downlink dedicated physical channel (DL DPCH) frame or a fractional dedicated physical channel (F-DPCH) frame header, and the DL DPCH or the F-DPCH frame comprises the HS-PDSCH subframe header, and wherein Non-time Reference=$\Gamma_{DIFF} \pm \Delta\Gamma_{F-DPCH}$ wherein $\Gamma_{DIFF}$ is an HS-PDSCH subframe boundary difference or an HS-PDSCH frame boundary difference between the time reference cell and the non-time reference cell, and $\Delta\Gamma_{F\text{-}DPCH}$ is an F-DPCH subframe boundary difference, an F-DPCH frame boundary difference, or an F-DPCH symbol boundary difference between the time reference cell and the non-time reference cell.

7. A communication system, comprising:
a radio network controller; and
a user equipment comprising,
  a memory,
  a receiving device configured to receive reference information of a non-time reference cell configured by the radio network controller, and
a processor is configured to obtain a high speed dedicated physical control channel (HS-DPCCH) timing in the non-time reference cell by using the reference information, wherein the reference information of the non-time reference cell received by the receiving device is a non-time reference, namely, Non-time Reference,
wherein an HS-DPCCH timing of the non-time reference cell is:

$$m=(T_{TX\_diff} \pm \text{Non-time Reference})/256+101;$$

wherein a range of $T_{TX\_diff}$ is an integral multiple of 256 and a maximum value thereof is 38144 chips, and $T_{TX\_diff}$ is a difference between the following two timings, where one timing is an HS-PDSCH subframe header, and the other timing is a downlink dedicated physical channel (DL DPCH) frame or a fractional dedicated physical channel (F-DPCH) frame header, and the DL DPCH or the F-DPCH frame comprises the HS-PDSCH subframe header, and
wherein Non-time Reference=$\Gamma_{DIFF} \pm \Delta\Gamma_{F\text{-}DPCH}$, wherein $\Gamma_{DIFF}$ is an HS-PDSCH subframe boundary difference or an HS-PDSCH frame boundary difference between the time reference cell and the non-time reference cell, and $\Delta\Gamma_{F\text{-}DPCH}$ is an F-DPCH subframe boundary difference, an F-DPCH frame boundary difference, or an F-DPCH symbol boundary difference between the time reference cell and the non-time reference cell.

8. The communication system according to claim 7, wherein there is a correspondence between the reference information of the non-time reference cell received by the receiving device and the HS-PDSCH subframe boundary difference or the HS-PDSCH frame boundary difference between the time reference cell and the non-time reference cell.

9. A communication system, comprising:
a radio network controller; and
a user equipment comprising,
  a memory,
  a receiving device configured to receive reference information of a non-time reference cell configured by the radio network controller, and
a processor is configured to obtain a high speed dedicated physical control channel (HS-DPCCH) timing in the non-time reference cell by using the reference information,
wherein the reference information of the non-time reference cell received by the receiving device is a non-time reference,
wherein the processor is configured to calculate, in the non-time reference cell, an HS-DPCCH timing of the non-time reference cell by using the following formula:
  m=round $(T_{TX\_diff} \pm \text{Non-time Reference})/256+101$,
wherein round is the rounding operation, a range of $T_{TX\_diff}$ is an integral multiple of 256 and a maximum value thereof is 38144 chips, and $T_{TX\_diff}$ is a difference between the following two timings,
wherein one timing is an HS-PDSCH subframe header, and the other timing is a downlink dedicated physical channel (DL DPCH) frame or a fractional dedicated physical channel (F-DPCH) frame header, and the DL DPCH or the F-DPCH frame comprises the HS-PDSCH subframe header, and
wherein Non-time Reference=$\Gamma_{DIFF} \pm \Delta\Gamma_{F\text{-}DPCH}$, wherein $\Gamma_{DIFF}$ is the HS-PDSCH subframe boundary difference or the HS-PDSCH frame boundary difference between the time reference cell and the non-time reference cell, and $\Delta\Gamma_{F\text{-}DPCH}$ is an F-DPCH subframe boundary difference, an F-DPCH frame boundary difference, or an F-DPCH symbol boundary difference between the time reference cell and the non-time reference cell.

* * * * *